(12) United States Patent
Arsovski et al.

(10) Patent No.: US 8,214,699 B2
(45) Date of Patent: Jul. 3, 2012

(54) CIRCUIT STRUCTURE AND METHOD FOR DIGITAL INTEGRATED CIRCUIT PERFORMANCE SCREENING

(75) Inventors: Igor Arsovski, Williston, VT (US); David J. Wager, Jericho, VT (US); Michael A. Ziegerhofer, Jeffersonville, VT (US)

(73) Assignee: International Business Machines Corporation, Armonk, NY (US)

( * ) Notice: Subject to any disclaimer, the term of this patent is extended or adjusted under 35 U.S.C. 154(b) by 1041 days.

(21) Appl. No.: 12/147,670

(22) Filed: Jun. 27, 2008

(65) Prior Publication Data
US 2009/0327620 A1    Dec. 31, 2009

(51) Int. Cl.
*G11C 29/12*    (2006.01)
(52) U.S. Cl. ........ 714/718; 714/717; 714/733; 711/154; 711/167; 365/154; 365/201
(58) Field of Classification Search ................... 714/718
See application file for complete search history.

(56) References Cited

U.S. PATENT DOCUMENTS

| | | | |
|---|---|---|---|
| 5,010,522 A | 4/1991 | Ashmore, Jr. | |
| 6,252,818 B1 | 6/2001 | Voss | |
| 6,266,749 B1 | 7/2001 | Hashimoto et al. | |
| 6,452,459 B1 | 9/2002 | Chan et al. | |
| 6,774,734 B2 | 8/2004 | Christensen et al. | |
| 6,867,613 B1 | 3/2005 | Bienek | |
| 6,870,777 B2 | 3/2005 | Maki | |
| 6,873,557 B2 | 3/2005 | Chang et al. | |
| 2003/0106010 A1* | 6/2003 | Fujioka et al. | 714/763 |
| 2003/0191998 A1* | 10/2003 | Nakamura | 714/733 |
| 2005/0066247 A1* | 3/2005 | Cheng et al. | 714/733 |
| 2006/0126412 A1* | 6/2006 | Maki | 365/201 |
| 2007/0016826 A1* | 1/2007 | Dubey | 714/30 |
| 2008/0089167 A1* | 4/2008 | Dono | 365/233.5 |
| 2008/0115019 A1* | 5/2008 | Ngo et al. | 714/724 |

* cited by examiner

*Primary Examiner* — Kaushikkumar Patel
(74) *Attorney, Agent, or Firm* — Gibb I.P. Law Firm, LLC (57) ABSTRACT

Disclosed is a semiconductor chip with a digital integrated circuit, such as a memory device (e.g., static random access memory (SRAM) arrays, dynamic random access memory (DRAM) arrays, content addressable memory (CAM) arrays, etc), that can be selectively operated in either a functional mode or in a performance screening mode. In the functional mode, a first signal supplied by an external signal generator is used to activate a first device in the circuit and, in response, a second device in the circuit outputs a data output signal. In the performance screening mode, a second signal is internally generated by an internal signal generator based on the data output signal. This second signal is then used to activate the first device in the circuit and, in response, the second device outputs the data output signal. Thus, in the performance screening mode, the digital integrated circuit is effectively converted into a performance screen ring oscillator (PSRO), the output of which can be monitored to determine whether performance criteria for the digital integrated circuit are met.

20 Claims, 4 Drawing Sheets

CIRCUIT STRUCTURE AND METHOD FOR DIGITAL INTEGRATED CIRCUIT PERFORMANCE SCREENING

BACKGROUND

1. Field of the Invention

The embodiments of the invention generally relate to performance screening of digital integrated circuits and, more particularly, to a circuit structure and method for selectively operating a digital integrated circuit, such as a memory device, in either a functional mode or in a performance screening mode.

2. Description of the Related Art

Variation aware timing (VAT) methodologies were developed to provide customers with a timing tool that properly takes into account across-chip parameter variations (e.g., channel length, threshold voltage (Vt), etc.) that impact timing. Performance screen ring oscillators (PSRO) are often used in VAT analyses of integrated circuits (e.g., of application-specific integrated circuits (ASICs)). These PSROs are on-chip structures comprising a ring of free-running, series-connected devices that oscillates at a frequency. At an output node, the oscillation frequency is measured and provides a relative indication of the actual speed of the integrated circuit under test in order to determine whether the integrated circuit meets performance specifications. Unfortunately, PSROs do not typically incorporate logic structures that dominate digital integrated circuits, such as memory devices (e.g., static random access memory (SRAM) arrays, dynamic random access memory (DRAM) arrays, content addressable memory (CAM) arrays, etc). Thus, conventional PSROs do not effectively track digital integrated circuit performance and, more particularly, do not effectively track memory performance. This failure to effectively track performance inevitably results in significant yield loss (e.g., due to overly-conservative and less-competitive timing models). Furthermore, as the size of memory arrays increases, the discrepancy between PSRO performance and memory array performance grows larger. Therefore, there is a need in the art for a more effective circuit structure and method for screening performance in digital integrated circuits and, more particularly, in memories.

SUMMARY

In view of the foregoing, disclosed herein are embodiments of a semiconductor chip with a digital integrated circuit, such as a memory device, that can be selectively operated in either a first mode (i.e., a functional mode) or in second mode (i.e., a performance screening mode). In the functional mode, a first signal supplied by an external signal generator is used to activate a first device in the circuit and, in response, a second device in the circuit outputs a data output signal. In the performance screening mode, a second signal is internally generated by an internal signal generator based on the data output signal. This second signal is then used to activate the first device in the circuit and, in response, the second device outputs the data output signal. Thus, in the performance screening mode, the digital integrated circuit is effectively converted into a performance screen ring oscillator (PSRO), the output of which can be monitored to determine whether performance criteria for the digital integrated circuit are met.

The embodiments of the semiconductor chip generally comprise a digital integrated circuit (e.g., some type of array) and a built-in self-test (BIST) engine. This digital integrated circuit can comprise at least a first device connected in series to a second device such that, in response to activation of the first device, the second device outputs a data output signal. The digital integrated circuit can also comprise a controller in communication with the first and second devices. The controller can be adapted to selectively operate the digital integrated circuit in either a first mode or a second mode. The BIST engine can be in communication with the controller and can be adapted to initiate the second mode and further to make pass/fail determinations in conjunction with the second mode.

Specifically, the controller can be adapted to receive a first signal from a first signal generator and can also be adapted to receive the data output signal from the second device. The controller can operate the digital integrated circuit in the first mode by applying the first signal to activate the first device. The controller can also comprise a second signal generator that is adapted to generate a second signal based on the data output signal. The controller can operate the digital integrated circuit in the second mode by bypassing the first signal and applying the second signal to activate the first device. When operating the digital integrated circuit in the second mode, the controller effectively converts the digital integrated circuit into a performance screen ring oscillator (PSRO).

As mentioned above, the BIST engine can be in communication with the controller and can be adapted to initiate the operation of the digital integrated circuit by the controller in second mode and further to make pass/fail determinations in conjunction with the second mode. More specifically, the controller can further comprise a frequency monitor that measures an oscillation frequency of the second signal. Then, the BIST engine can be adapted to compare the measured oscillation frequency of the second signal to a predetermined allowable frequency range. The BIST engine can further be adapted to output a pass signal, if the oscillation frequency is within the predetermined allowable frequency range, and to output a fail signal, if the oscillation frequency is outside the predetermined frequency range.

In one exemplary embodiment, the semiconductor chip can comprise a memory device and a BIST engine. In this case, the memory device can comprise a memory array comprising a plurality of memory cells electrically connected in rows by wordlines and in columns by bitlines. The memory device can further comprise a decoder circuit that selectively activates one of the wordlines in order to read one of the memory cells, during a read operation. The memory device can also comprise a sense amplifier electrically connected to the memory cell by a corresponding bitline such that, in response to activation of the selected wordline, the sense amplifier outputs a data output signal. Finally, the memory device can comprise a controller in communication with the decoder circuit and the sense amplifier.

The controller can be adapted to selectively operate the memory device in either a first mode or a second mode. The BIST engine can be in communication with the controller and can be adapted to initiate the second mode and further to make pass/fail determinations in conjunction with the second mode.

Specifically, the controller can be adapted to receive a first clock signal from a first clock signal generator, a first address signal from a first address signal generator, and the data output signal from the sense amplifier. The first address signal identifies the memory address for a specific memory cell to be accessed during the standard read operation. The controller can operate the memory device in the first mode by supplying the first clock and address signals to the decoder circuit. In response to the first clock and address signals, the decoder circuit can identify and activate a specific wordline corresponding to the specific memory cell. The controller can further be adapted to supply the first clock signal to the sense amplifier and any other component of the memory device, as necessary, in order to clock the standard read operation.

As mentioned above, the BIST engine can be in communication with the controller and can be adapted to initiate operation of the memory device by the controller in the second mode. To accomplish this, the BIST engine can comprise a second address signal generator adapted to generate and supply a second address signal to the controller. The second address signal identifies the memory address for a specific memory cell to be accessed during a performance screening read operation. Furthermore, the controller can comprise a second clock signal generator that is adapted to generate a second clock signal based on the data output signal from the sense amplifier. Specifically, the second clock signal generator can be adapted to generate the second clock signal based on the data output signal from a single memory cell in the memory array. Alternatively, the second clock signal generator can be adapted to generate the second clock signal by gating at least two data output signals from at least two memory cells in the memory array.

The controller can operate the memory device in the second mode by bypassing the first clock and address signals and supplying the second clock and address signals to the decoder circuit. In response to the second address and clock signals, the decoder circuit can identify and activate a specific wordline corresponding to the specific memory cell. The controller can further supply the second clock signal to the sense amplifier and other components of the memory device, as necessary, in order to clock the performance screening read operation. When operating the memory device in the second mode, the controller effectively converts the memory device into a performance screen ring oscillator (PSRO) having an oscillation frequency that is a function of memory access speed through the memory access path for the addressed memory cell. Furthermore, if the memory device comprises any memory access paths with pipelined latches, then, when operating the memory device in the second mode, the controller will hold those pipelined latches in flush.

Also as mentioned above, the BIST engine can be adapted to make pass/fail determinations in conjunction with the second mode. More specifically, the controller can further comprise a frequency monitor that measures an oscillation frequency of the second clock signal that is internally generated based on data output signal(s) from the sense amplifier. Then, the BIST engine can be adapted to compare the measured oscillation frequency of the second clock signal to a predetermined allowable frequency range. The BIST engine can further be adapted to output, for a given memory access path, a pass signal, if the oscillation frequency is within the predetermined allowable frequency range, and to output a fail signal, if the oscillation frequency is outside the predetermined frequency range. Alternatively or additionally, the BIST engine can acquire oscillation frequencies associated with read operations of multiple memory cells located at different addresses within the memory array and can analyze those multiple oscillations frequencies to get a statistical representation of overall memory performance. Thus, for example, a pass/fail signal can be based on a comparison between the predetermined frequency range and an average oscillation frequency associated with multiple data access paths.

Also disclosed herein are method embodiments for selectively operating a digital integrated circuit and, more specifically, for selectively operating a memory device in both functional and performance screening modes. The method embodiments generally comprise providing a digital integrated circuit, such as the digital integrated circuit described above. This digital integrated circuit is selectively operated in either a first mode or a second mode. That is, when operating the digital integrated circuit in the first mode, the first device is activated with a first signal from a first signal generator. However, when the operating of the digital integrated circuit in the second mode, the first signal is bypassed and a second signal is internally generated (e.g., by a second signal generator) based on the data output signal from the second device. This internally generated second signal is then used to activate the first device. Thus, operating of the digital integrated circuit in the second mode effectively converts the digital integrated circuit into a performance screen ring oscillator (PSRO). Consequently, the method embodiments can further comprise measuring an oscillation frequency of the second signal, comparing the oscillation frequency to a predetermined allowable frequency range and outputting a pass/fail signal based on the comparison. That is, a pass signal can be output, if the oscillation frequency is within the predetermined allowable frequency range, and a fail signal can be output, if the oscillation frequency is outside the predetermined frequency range.

In one exemplary embodiment, the process of providing a digital integrated circuit can, more specifically, comprise providing a memory device, such as the memory device described above. This memory device is selectively operated in either a first or a second mode. The process of operating the memory device in the first mode comprises receiving a first clock signal from a first clock signal generator and a first address signal from a first address signal generator. The first address signal can identify the memory address for a specific memory cell to be accessed during a standard read operation. The memory device can then be operated in the first mode by supplying the first clock and address signals to the decoder circuit. In response to the first clock and address signals, the decoder circuit can identify and activate a specific wordline corresponding to the specific memory cell. During this first mode, the first clock signal can further be supplied (e.g., by the controller) to the sense amplifier and any other component of the memory device, as necessary, in order to clock the standard read operation.

The process of operating the memory device in the second mode can comprise receiving a second address signal generated, for example, by a second address signal generator in a BIST engine. The second address signal can identify the memory address for a specific memory cell to be accessed during a performance screening read operation. Furthermore, a second clock signal can be internally generated (e.g., by a second clock signal generator within the controller) based on the data output signal from the sense amplifier. Specifically, the second clock signal can be internally generated based on the data output signal from a single memory cell in the memory array. Alternatively, the second clock signal can be internally generated by gating at least two data output signals from at least two memory cells in the memory array.

The first clock and address signals can be bypassed and the second clock and address signals can be supplied to the decoder circuit and used to identify and activate a specific wordline corresponding to the specific memory cell addressed. The second clock signal can further be supplied to the sense amplifier and other components of the memory device, as necessary, in order to clock the performance screening read operation. Operating the memory device in the second mode, as described above, effectively converts the memory device into a performance screen ring oscillator (PSRO) having an oscillation frequency that is a function of memory access speed through the memory access path for the addressed memory cell. Additionally, if the memory device comprises any memory access paths with pipelined latches, then the process of operating the memory device in the second mode further comprises holding all of the pipelined latches in flush.

Since, as mentioned above, operating the memory device in the second mode effectively converts the memory device into a PSRO, the method embodiments can further comprise measuring an oscillation frequency of the second clock signal, comparing the oscillation frequency to a predetermined allowable frequency range and outputting a pass/fail signal based on the comparison. That is, a pass signal can be output, if the oscillation frequency is within the predetermined allowable frequency range, and a fail signal can be output, if the oscillation frequency is outside the predetermined frequency range. Alternatively or additionally, oscillation frequencies associated with read operations of multiple memory cells located at different addresses within the memory array can be acquired and those multiple oscillations frequencies can be analyzed to get a statistical representation of overall memory performance. Thus, for example, a pass/fail signal can be based on a comparison between the predetermined frequency range and an average oscillation frequency associated with multiple data access paths.

These and other aspects of the embodiments of the invention will be better appreciated and understood when considered in conjunction with the following description and the accompanying drawings. It should be understood, however, that the following descriptions, while indicating embodiments of the invention and numerous specific details thereof, are given by way of illustration and not of limitation. Many changes and modifications may be made within the scope of the embodiments without departing from the spirit thereof, and the embodiments include all such changes and modifications.

BRIEF DESCRIPTION OF THE DRAWINGS

The embodiments of the invention will be better understood from the following detailed description with reference to the drawings, in which.

DETAILED DESCRIPTION OF EMBODIMENTS

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

As mentioned above, Variation Aware Timing (VAT) was developed to provide customers with a timing tool that properly takes into account across-chip parameter variations (e.g., channel length, threshold voltage (Vt), etc.) that impact timing. Performance screen ring oscillators (PSRO) are often used in VAT performance screening of integrated circuits (e.g., of application-specific integrated circuits (ASICs)). These PSROs are on-chip structures comprising a ring of free-running, series-connected devices that transmit a frequency. At an output node, the oscillation frequency is measured and provides a relative indication of the actual speed of the integrated circuit under test in order to determine whether the integrated circuit meets performance specifications. Unfortunately, PSROs do not typically incorporate logic structures that dominate digital integrated circuits, such as memory devices (e.g., static random access memory (SRAM) arrays, dynamic random access memory (DRAM) arrays, content addressable memory (CAM) arrays, etc). Thus, conventional PSROs do not effectively track digital integrated circuit performance and, more particularly, do not effectively track memory performance. This failure to effectively track performance inevitably results in significant yield loss (e.g., due to overly-conservative and less-competitive timing models). Furthermore, as the size of memory arrays increases, the discrepancy between PSRO performance and memory array performance grows larger. Therefore, there is a need in the art for a more effective circuit structure and method for screening performance in digital integrated circuits and, more particularly, in memories.

In view of the foregoing, disclosed herein are embodiments of a semiconductor chip with a digital integrated circuit, such as a memory device (e.g., static random access memory (SRAM) arrays, dynamic random access memory (DRAM) arrays, content addressable memory (CAM) arrays, etc), that can be selectively operated in either a first mode (i.e., a functional mode, standard operational mode, etc.) or in second mode (i.e., a performance screening mode). In the functional mode, a first signal supplied by an external signal generator is used to activate a first device in the circuit and, in response, a second device in the circuit outputs a data output signal. In the performance screening mode, a second signal is internally generated by an internal signal generator based on the data output signal. This second signal is then used to activate the first device in the circuit and, in response, the second device outputs the data output signal. Thus, in the performance screening mode, the digital integrated circuit is effectively converted into a performance screen ring oscillator (PSRO), the output of which can be monitored to determine whether performance criteria for the digital integrated circuit are met.

Figure 1:
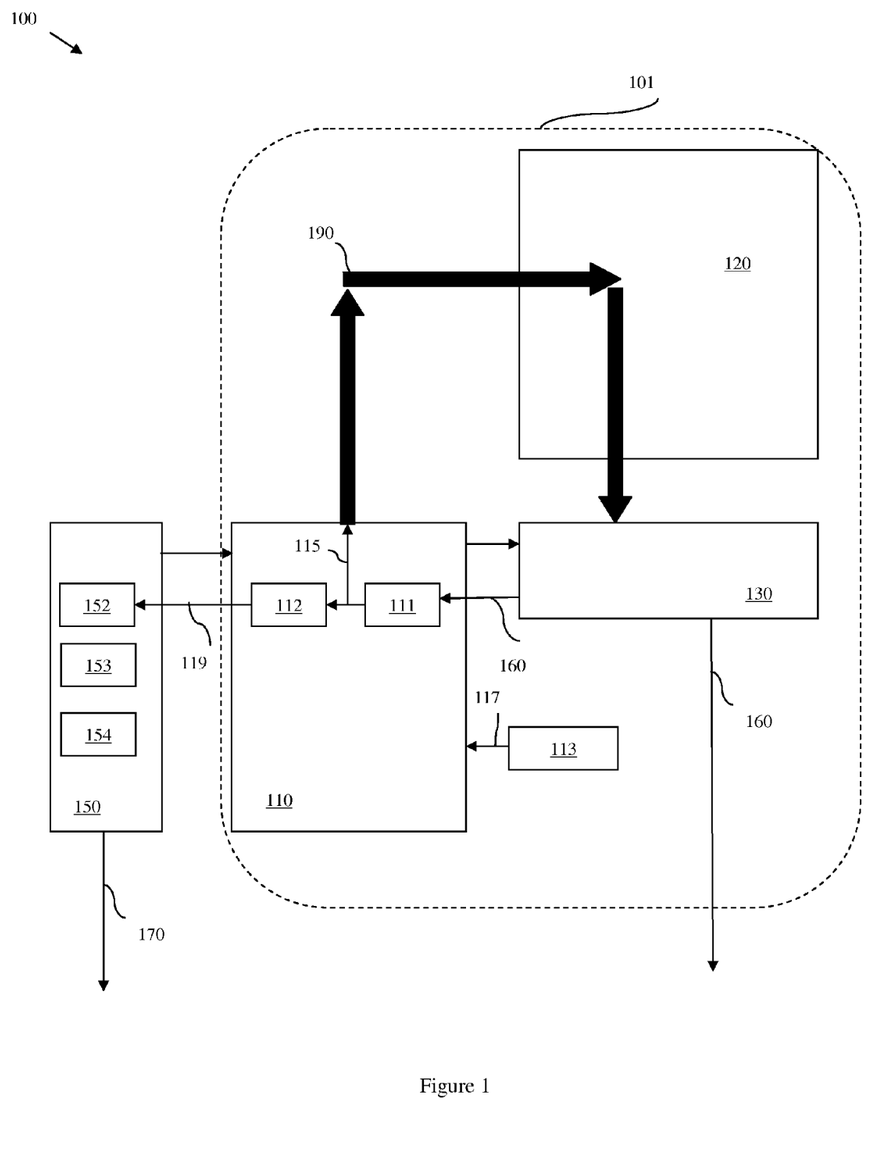
FIG. 1 is a schematic diagram illustrating an embodiment of the structure of the present invention.

Referring to FIG. 1, embodiments of the semiconductor chip 100 generally comprise a digital integrated circuit 101 (e.g., some type of an array) and a built-in self-test (BIST) engine 150. This digital integrated circuit 101 can comprise a controller 110 and at least a first device 120 connected in series to a second device 130 such that, in response to activation of the first device 120, the second device 130 outputs a data output signal 160. The controller 110 can be adapted to (i.e., configured to) selectively operate the digital integrated circuit 101 in either a first mode (i.e., a functional mode, a standard operational mode, etc.) or a second mode (i.e., a performance screen mode). The BIST engine 150 can be in communication with the controller 110 and can be adapted to (i.e., configured to) initiate the second mode and further to make pass/fail determinations in conjunction with the second mode.

Specifically, the controller 110 can be adapted to (i.e., configured to) receive a first signal 117 from a first signal generator 113 (i.e., an external signal generator) and can also be adapted to receive the data output signal 160 from the second device 130. The controller 110 can operate the digital integrated circuit 101 in the first mode by applying the first signal 117 to activate the first device 120 along data access path 190. The controller 110 can also comprise a second signal generator 111 (i.e., an internal signal generator) that is adapted to (i.e., configured to) generate a second signal 115 based on the data output signal 160. The controller 110 can operate the digital integrated circuit 101 in the second mode by bypassing the first signal 117 and applying the second signal 115 to activate the first device 120. When operating the digital integrated circuit 101 in the second mode, the controller 110 effectively converts the digital integrated circuit 101 into a performance screen ring oscillator (PSRO).

As mentioned above, the BIST engine 150 can be in communication with the controller 110 and can be adapted to (i.e., configured to) initiate the operation of the digital integrated circuit 101 by the controller 110 in second mode and further to make pass/fail determinations in conjunction with the second mode. More specifically, the controller 110 can further comprise a frequency monitor 112 that measures an oscillation frequency of the second signal 115. Then, the BIST engine 150 can be adapted to compare (e.g., using a comparator 153) the measured oscillation frequency 119 of the second signal 115 to a predetermined allowable frequency range. The predetermined allowable frequency range can be pre-loaded onto (e.g., stored in a database 154 on) the BIST engine 150. The BIST engine 150 can further be adapted to (i.e., configured to) output a pass/fail signal 170 based on the results of the comparison. Specifically, the BIST engine 150 can be adapted to output a pass signal, if the oscillation frequency is within the predetermined allowable frequency range, and to output a fail signal, if the oscillation frequency is outside the predetermined frequency range.

Figure 2:
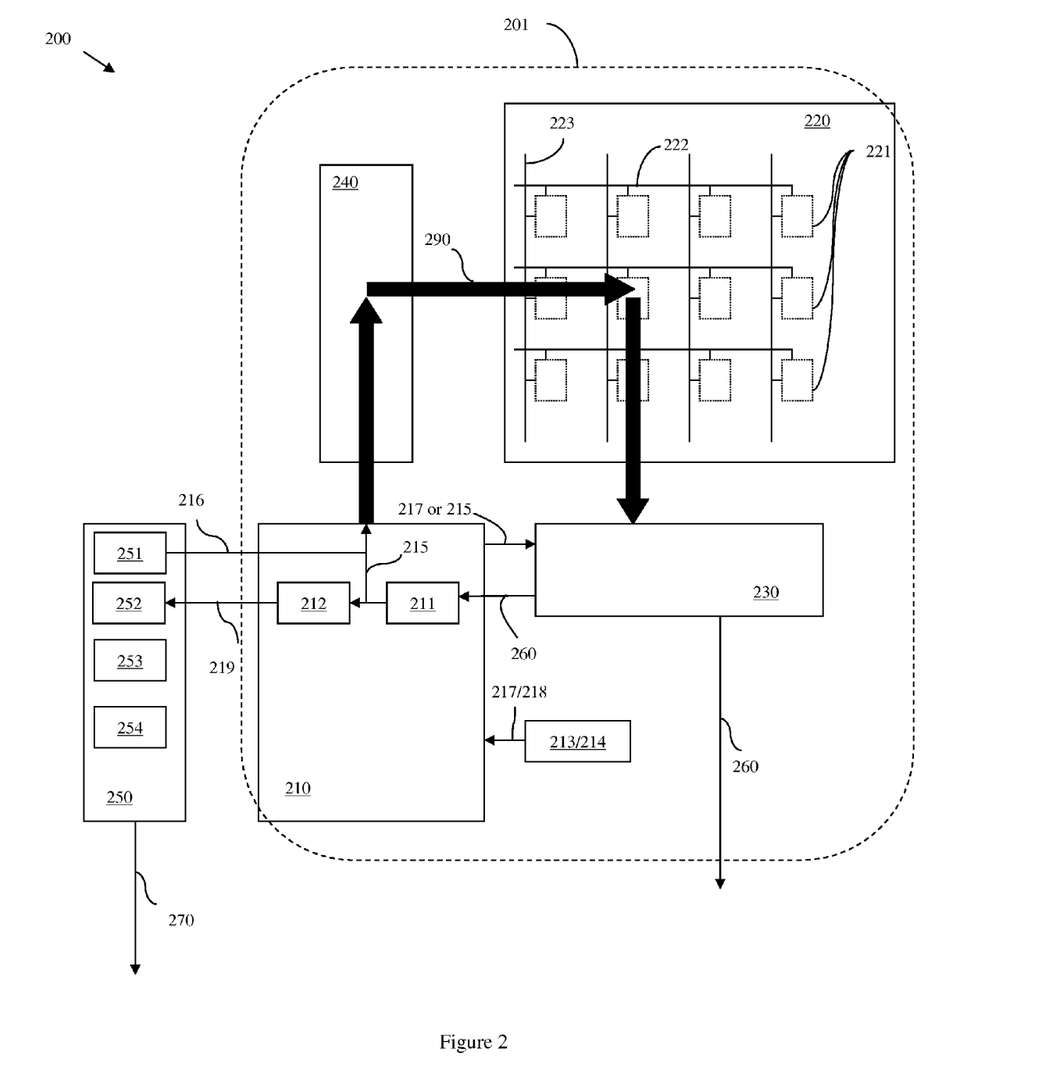
FIG. 2 is a schematic diagram illustrating another embodiment of the structure of the present invention.

Referring to FIG. 2, in one exemplary embodiment, the semiconductor chip 200 can comprise a memory device 201, and a BIST engine 250. In this case, the memory device 201 can comprise a controller 210 (i.e., control logic) and a memory array 220 (e.g., static random access memory (SRAM) array, dynamic random access memory (DRAM) array, content addressable memory (CAM) array, etc) comprising a plurality of memory cells 221 electrically connected in rows by wordlines 222 and in columns by bitlines 223. The memory device 201 can further comprise a decoder circuit 240 that selectively activates one of the wordlines 222 in order to access and read data store in one of the memory cells 221, during a read, write or search operation. The memory device 201 can also comprise a sense amplifier and or write driver 230 electrically connected to the memory array 220 and, more particularly, one or more memory cells 221 by corresponding bitlines 223 such that, in response to activation of the selected wordline 222, the sense amplifier 230 outputs a data output signal 260.

The controller 210 can be in communication with both the decoder circuit 240 and the sense amplifier 230 and can be adapted to (i.e., configured to) selectively operate the memory device 201 in either a first mode (i.e., a functional mode, a standard operational mode, etc.) or a second mode (i.e., a performance screening mode). The BIST engine 250 can be in communication with the controller 210 and can be adapted to (i.e., configured to) initiate the second mode and further to make pass/fail determinations in conjunction with the second mode.

Specifically, the controller 210 can be adapted to (i.e., configured to) receive a first clock signal 217 from a first clock signal generator 213 (i.e., an external clock signal generator), a first address signal 218 from a first address signal generator 214 (i.e., an external address signal generator), and the data output signal 260 from the sense amplifier 230. The first address signal 218 identifies the memory address within the array 220 for a specific memory cell 221 to be accessed during the standard read operation. The controller 210 can operate the memory device 201 in the first mode by supplying the first clock signal 217 from the first clock signal generator 213 and the first address signal 218 from the first address signal generator 214 to the decoder circuit 240. In response to the first clock and address signals 217/218, the decoder circuit 240 can identify and activate a specific wordline 222 and, thereby, a specific memory access path 290 corresponding to the specific memory cell 221. The controller 210 can further be adapted to (i.e., configured to) supply the first clock signal to the sense amplifier 230 and any other component of the memory device 210, as necessary, in order to clock the standard read operation (i.e., to trigger capture of the data).

As mentioned above, the BIST engine 250 can be in communication with the controller 210 and can be adapted to (i.e., configured to) initiate operation of the memory device 201 by the controller 210 in the second mode. To accomplish this, the BIST engine 250 can comprise a second address signal generator 251 adapted to (i.e., configured to) generate and supply a second address signal 216 to the controller 210. The second address signal 216 identifies the memory address within the array 220 for a specific memory cell 220 to be accessed/read during a performance screening read operation. Furthermore, the controller 210 can comprise a second clock signal generator 211 (i.e., an internal clock signal generator) that is adapted to (i.e., configured to) generate a second clock signal 215 based on the data output signal 260 from the sense amplifier 230. Specifically, the second clock signal generator 211 can be adapted to generate the second clock signal 215 based on the data output signal from a single memory cell in the memory array. Alternatively, the second clock signal generator 211 can be adapted to generate the second clock signal 215 by gating at least two data output signals from at least two memory cells in the memory array 220. For example, all data outputs can be ANDed together to drive the second clock signal 215 and the slowest data output can drive the limiting frequency for the memory cell under test.

The controller 210 can operate the memory device 201 in the second mode by bypassing the first clock and address signals 217/218 and supplying the second clock and address signals 215/216 to the decoder circuit 240. In response to the second address and clock signals 215/216, the decoder circuit 240 can identify and activate a specific wordline and, more specifically, a specific data access path 290 corresponding to the specific memory cell 221. The controller 210 can further supply the second clock signal 215 to the sense amplifier 230 and other components of the memory device 201, as necessary, in order to clock the performance screening read operation (i.e., to trigger data capture). When operating the memory device 201 in the second mode, the controller 210 effectively converts the memory device 210 into a performance screen ring oscillator (PSRO) having an oscillation frequency that is a function of memory access speed through the memory access path 290 for the addressed memory cell 221. That is, when running in the second mode the data output will generate the next clock, which in turn will generate the next data output, and so on. It should be understood that in order for a PSRO to function properly, it must be free-running. Thus, if the memory device 201 comprises any memory access paths 290 with pipelined latches, then, when operating the memory device 201 in the second mode, the controller 210 will hold those pipelined latches in flush. Pipelined latches that are held in flush will appear transparent during the second mode so that the signal is propagated continuously through the PSRO (i.e., so that the signal is free-running).

Also as mentioned above, the BIST engine 250 can be adapted to (i.e., configured to) make pass/fail determinations in conjunction with the second mode. More specifically, the controller 210 can further comprise a frequency monitor 212 that measures an oscillation frequency of the second clock signal 215 that is internally generated based on data output signal(s) 260 from the sense amplifier 230. Then, the BIST engine 250 can be adapted to compare (e.g., by using a comparator 253) the measured oscillation frequency 219 of the second clock signal 215 to a predetermined allowable frequency range. The predetermined allowable frequency range can be pre-loaded onto (e.g., stored in a database 254 on) the BIST engine 250. The BIST engine 250 can further be adapted to (i.e., configured to) output, for a given memory access path, a pass/fail signal 270. That is, the BIST engine 250 can output a pass signal, if the oscillation frequency 219 is within the predetermined allowable frequency range, and to output a fail signal, if the oscillation frequency 219 is outside the predetermined frequency range. Performance can further be qualified by the BIST engine 250 based on the address of the memory cell screened and, thereby, the length of the memory access path 290. Alternatively or additionally, the BIST engine 250 can acquire oscillation frequencies 219 associated with read operations of multiple memory cells 221 located at different addresses within the memory array 220 and can analyze those multiple oscillations frequencies to get a statistical representation of overall memory performance. Thus, for example, a pass/fail signal 270 can be based on a comparison (e.g., by comparator 253) between the predetermined frequency range and an average oscillation frequency associated with multiple data access paths.

Figure 3:
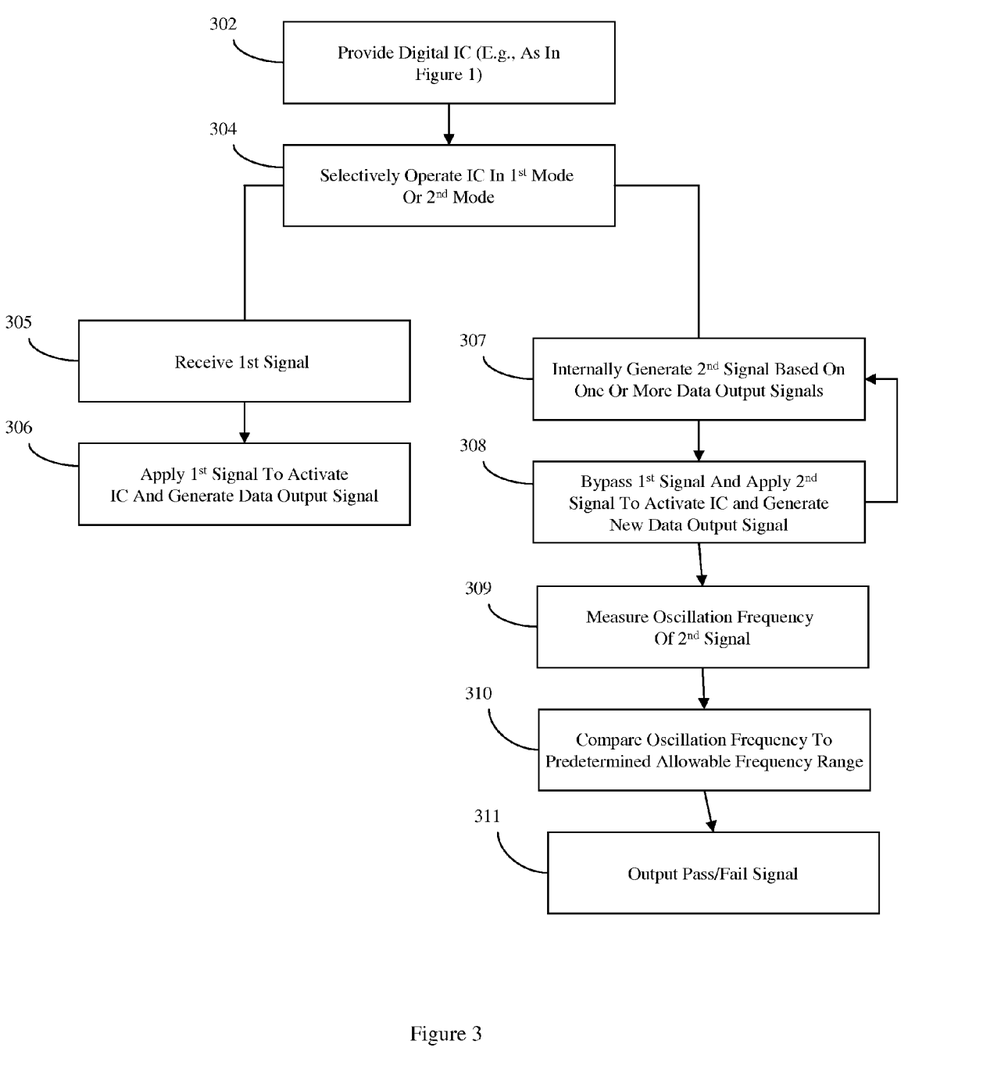
FIG. 3 is a flow diagram illustrating an embodiment of the method of the present invention.

Also disclosed herein are method embodiments for selectively operating a digital integrated circuit and, more specifically, for selectively operating a memory device in both functional and performance screening modes. Referring to FIG. 3, the method embodiments generally comprise providing a digital integrated circuit, such as the digital integrated circuit 101 described above, comprising a first device connected in series to a second device such that, in response to activation of the first device, the second device outputs a data output signal (302, see FIG. 1). This digital integrated circuit 101 is selectively operated in either a first mode (i.e., a functional mode, standard operational mode, etc.) or a second mode (i.e., a performance screening mode) (304). That is, when operating the digital integrated circuit in the first mode, the first device is activated with a first signal from a first signal generator (i.e., an external signal generator) (305-306). However, when the operating of the digital integrated circuit in the second mode, the first signal is bypassed and a second signal is internally generated (e.g., by a second internal signal generator) based on the data output signal from the second device (307-308). This internally generated second signal is then used to activate the first device. Thus, operating of the digital integrated circuit in the second mode effectively converts the digital integrated circuit into a performance screen ring oscillator (PSRO). Consequently, the method embodiments can further comprise measuring an oscillation frequency of the second signal (309), comparing the oscillation frequency to a predetermined allowable frequency range (310) and outputting a pass/fail signal based on the comparison (311). That is, a pass signal can be output, if the oscillation frequency is within the predetermined allowable frequency range, and a fail signal can be output, if the oscillation frequency is outside the predetermined frequency range.

Figure 4:
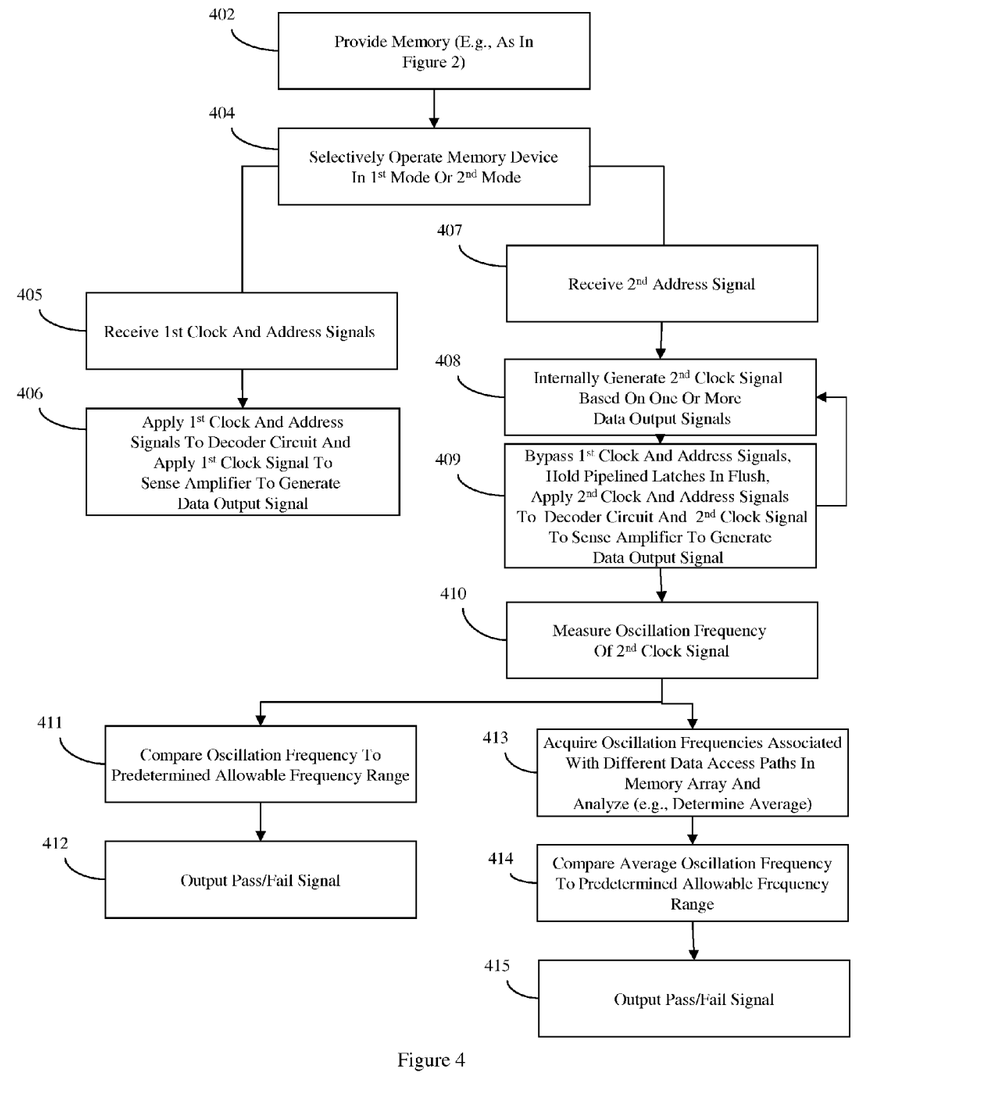
FIG. 4 is a flow diagram illustrating another embodiment of the method of the present invention.

Referring to FIG. 4, in one exemplary embodiment, the process of providing a digital integrated circuit can, more specifically, comprise providing a memory device, such as the memory device 201 described above (402, see FIG. 2). That is, this memory device 201 can comprise a memory array 220 comprising a plurality of memory cells 221 electrically connected in rows by wordlines 222 and in columns by bitlines 223. The memory device 201 can further comprise a decoder circuit 240 that selectively activates one of the wordlines 222 in the array in order to read one of the memory cells 221, during a read operation. Finally, the memory device 201 can comprise a sense amplifier 230 electrically connected to one or more of the memory cell 221 by a corresponding bitlines 223 such that, in response to activation of a selected wordline 222, the sense amplifier 230 outputs a data output signal 260. This memory device 201 is selectively operated in either a first mode (i.e., the functional mode, standard operational mode, etc.) or a second mode (i.e., a performance screening mode) (404).

The process of operating the memory device in the first mode comprises receiving (e.g., by a controller) a first clock signal 217 from a first clock signal generator 213 (i.e., an external clock signal generator) and a first address signal 218 from a first address signal generator 214 (i.e., an external address signal generator) (405). The first address signal 218 can identify the memory address for a specific memory cell 221 to be accessed/read during a standard read operation. The memory device 201 can then be operated (e.g., by the controller) in the first mode by supplying the first clock signal 217 from the first clock signal generator 213 and the first address signal 218 from the first address signal generator 214 to the decoder circuit 240 (406). In response to the first address and clock signals 217/218, the decoder circuit 240 can identify and activate a specific wordline 222 and, more particularly, the data access path 290 corresponding to the specific memory cell 221. During this first mode, the first clock signal 217 can further be supplied (e.g., by the controller 210) to the sense amplifier 230 and any other component of the memory device 201, as necessary, in order to clock the standard read operation (i.e., trigger capture of the data) (406).

The process of operating the memory device in the second mode can comprise receiving (e.g., by the controller from a BIST engine) a second address signal 216 generated, for example, by a second address signal generator 251 in the BIST engine 250 (407). The second address signal 216 can identify the memory address within the array for a specific memory cell 221 to be accessed during a performance screening read operation. Furthermore, a second clock signal 215 can be internally generated (e.g., by a second clock signal generator 211 within the controller 210) based on the data output signal 260 from the sense amplifier 230 (408). Specifically, the second clock signal 215 can be internally generated based on the data output signal from a single memory cell 221 in the memory array 220. Alternatively, the second clock signal 215 can be internally generated by gating at least two data output signals from at least two memory cells 221 in the memory array 220. For example, all data outputs can be ANDed together to drive the second clock signal 215 and the slowest data output can drive the limiting frequency for the memory cell 221 under test.

The first clock and address signals 217/218 can be bypassed and the second clock and address signals 215/216 can be supplied to the decoder circuit 240 and used to identify and activate a specific wordline 222 and, more particularly, a specific data access path 290 corresponding to the specific memory cell 221 addressed (409). The second clock signal 215 can further be supplied to the sense amplifier 230 and other components of the memory device 201, as necessary, in order to clock the performance screening read operation (i.e., to trigger data capture) (409). Operating the memory device in the second mode, as described above, effectively converts the memory device 201 into a performance screen ring oscillator (PSRO) having an oscillation frequency that is a function of memory access speed through the memory access path 290 for the addressed memory cell 221. That is, when running in the second mode the data output 260 will generate the next clock 215, which in turn will generate the next data output 260, and so on. It should be understood that in order for a PSRO to function properly, it must be free-running. Thus, if the memory device 201 comprises any memory access paths with pipelined latches, then the process of operating the memory device in the second mode further comprises holding all of the pipelined latches in flush (409). Pipelined latches that are held in flush will appear transparent during the second mode so that the signal is propagated continuously through the PSRO.

Since, as mentioned above, operating the memory device in the second mode effectively converts the memory device 201 into a PSRO, the method embodiments can further comprise measuring an oscillation frequency of the second clock signal 215 (410), comparing the oscillation frequency 219 of the second clock signal 215 to a predetermined allowable frequency range (411) and outputting a pass/fail signal 270 based on the comparison (412). That is, a pass signal can be output, if the oscillation frequency 219 is within the predetermined allowable frequency range, and a fail signal can be output, if the oscillation frequency 219 is outside the predetermined frequency range. Performance can further be qualified by based on the address of the memory cell screened and, thereby, the length of the memory access path. Alternatively or additionally, oscillation frequencies associated with read operations of multiple memory cells 221 located at different addresses within the memory array 220 can be acquired and those multiple oscillations frequencies can be analyzed to get a statistical representation of overall memory performance (413). Thus, for example, a pass/fail signal 270 can be based on a comparison between the predetermined frequency range and an average oscillation frequency associated with multiple data access paths (414-415).

Therefore, disclosed above are embodiments of a semiconductor chip with a digital integrated circuit, such as a memory device (e.g., static random access memory (SRAM) arrays, dynamic random access memory (DRAM) arrays, content addressable memory (CAM) arrays, etc), that can be selectively operated in either a functional mode or in a performance screening mode. In the functional mode, a first signal supplied by an external signal generator is used to activate a first device in the circuit and, in response, a second device in the circuit outputs a data output signal. In the performance screening mode, a second signal is internally generated by an internal signal generator based on the data output signal. This second signal is then used to activate the first device in the circuit and, in response, the second device outputs the data output signal. Thus, in the performance screening mode, the digital integrated circuit is effectively converted into a performance screen ring oscillator (PSRO), the output of which can be monitored to determine whether performance criteria for the digital integrated circuit are met. Thus, the invention avoids the need for conventional, discrete, PSRO by taking advantage of the natural oscillation frequency of the digital integrated circuit itself. Consequently, the disclosed screening process effectively tracks memory performance and can easily be incorporated into variation aware timing (VAT) methodologies. Furthermore, the same BIST engines that are currently used to test memory can also be used to measure memory performance. Operating functional integrated circuit devices, such as memory arrays, in the disclosed performance screening mode will inevitably allow for greater yield, reduce SPQL (i.e., a reduce the number of bad chips being shipped into the field) and provide for a better understanding of part timing and, thereby an improved ability to meet customer requirements.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the invention has been described in terms of embodiments, those skilled in the art will recognize that the embodiments can be practiced with modification within the spirit and scope of the appended claims.

What is claimed is:

1. A semiconductor chip comprising:
a digital integrated circuit comprising a first device connected in series to a second device such that, in response to activation of said first device, said second device outputs a data output signal; and
a controller in communication with said first device and said second device,
said controller receiving a first clock signal from a first clock signal generator that is external to said controller and receiving said data output signal from said second device,
said controller comprising a second clock signal generator that generates a second clock signal based on said data output signal, and
said controller further selectively operating said digital integrated circuit in one of a first mode, by applying said first clock signal to activate said first device, and a second mode, by applying said second clock signal to activate said first device.

2. The semiconductor chip, according to claim 1, said controller, when operating said digital integrated circuit in said second mode, effectively converting said digital integrated circuit into a performance screen ring oscillator (PSRO).

3. The semiconductor chip, according to claim 1, said controller further comprising a frequency monitor that receives said second clock signal from said second clock signal generator and measures an oscillation frequency of said second clock signal.

4. The semiconductor chip, according to claim 3, further comprising a built-in self test (BIST) engine in communication with said controller, said BIST engine initiating operation of said digital integrated circuit in said second mode and comparing, during said second mode, said oscillation frequency to a predetermined allowable frequency range.

5. The semiconductor chip, according to claim 4, said BIST engine further outputting a pass signal if said oscillation frequency is within said predetermined allowable frequency range and outputting a fail signal if said oscillation frequency is outside said predetermined frequency range.

6. A semiconductor chip comprising:
a memory device comprising:
- a memory array comprising a plurality of memory cells electrically connected in rows by wordlines and in columns by bitlines;
- a decoder circuit that selectively activates one of said wordlines in order to read one of said memory cells, during a read operation;
- a sense amplifier electrically connected to said one of said memory cells by a corresponding one of said bitlines such that, in response to activation of said one of said wordlines, said sense amplifier outputs a data output signal; and
- a controller in communication with said decoder circuit and said sense amplifier, said controller selectively operating said memory device in one of a first mode and a second mode, said controller, when operating said memory device in said first mode, supplying a first clock signal from a first clock signal generator to said decoder circuit and to said sense amplifier in order to activate said one of said wordlines and clock said read operation, said controller comprising a second clock signal generator that generates a second clock signal based on said data output signal, and said controller, when operating said memory device in said second mode, supplying said second clock signal to said decoder circuit and to said sense amplifier in order to activate said one of said wordlines and clock said read operation.

7. The semiconductor chip, according to claim 6, said controller, when operating said memory device in said second mode, effectively converting said memory device into a performance screen ring oscillator (PSRO) having an oscillation frequency that is a function of memory access speed.

8. The semiconductor chip, according to claim 6, said controller further comprising a frequency monitor that measures an oscillation frequency of said second clock signal.

9. The semiconductor chip, according to claim 8, further comprising a built-in self test (BIST) engine in communication with said controller, said BIST engine initiating operation of said memory device in said second mode and further, during said second mode, comparing said oscillation frequency to a predetermined allowable frequency range.

10. The semiconductor chip, according to claim 9, said BIST engine further outputting a pass signal if said oscillation frequency is within said predetermined allowable frequency range and outputting a fail signal if said oscillation frequency is outside said predetermined frequency range.

11. The semiconductor chip, according to claim 9, said BIST engine further acquiring oscillation frequencies associated with one of read and search operations of multiple memory cells located at different addresses within said memory array and analyzing said oscillations frequencies to get a statistical representation of overall memory performance.

12. The semiconductor chip, according to claim 6, said second clock signal generator further generating said second clock signal by gating at least two data output signals from at least two of said memory cells.

13. The semiconductor chip, according to claim 6, said memory device comprising a memory access path with pipelined latches and said controller, when operating said memory device in said second mode, holding said pipelined latches in flush.

14. A method of operating a digital integrated circuit, said method comprising:
providing a digital integrated circuit comprising:
- a first device connected in series to a second device such that, in response to activation of said first device, said second device outputs a data output signal; and
- a controller in communication with said first device and said second device; and selectively operating said digital integrated circuit in one of a first mode and a second mode, said operating of said digital integrated circuit in said first mode comprising activating said first device with a first clock signal from a first clock signal generator that is external to said controller, and said operating of said digital integrated circuit in said second mode comprising internally generating a second clock signal based on said data output signal and activating said first device with said second clock signal.

15. The method, according to claim 14, said operating of said digital integrated circuit in said second mode being performed so as to effectively converts said digital integrated circuit into a performance screen ring oscillator (PSRO).

16. The method, according to claim 14, further comprising:
- measuring an oscillation frequency of said second clock signal;
- comparing said oscillation frequency to a predetermined allowable frequency range; and
- outputting a pass signal, if said oscillation frequency is within said predetermined allowable frequency range, and outputting a fail signal, if said oscillation frequency is outside said predetermined frequency range.

17. The method, according to claim 14,
said providing of said digital integrated circuit comprising providing a memory device, said memory device comprising:
- a memory array comprising a plurality of memory cells electrically connected in rows by wordlines and in columns by bitlines;
- a decoder circuit that selectively activates one of said wordlines in order to read one of said memory cells, during a read operation;
- a sense amplifier electrically connected to said one of said memory cells by a corresponding one of said bitlines such that, in response to activation of said one of said wordlines, said sense amplifier outputs a data output signal; and
- said controller in communication with said sense amplifier and said decoder circuit, said operating of said digital integrated circuit in said first mode comprising supplying said first clock signal from said first clock signal generator to said decoder circuit and to said sense amplifier in order to activate said one of said wordlines and clock said read operation of said memory device, and said operating of said digital integrated circuit in said second mode comprising: supplying said second clock signal to said decoder circuit and to said sense amplifier in order to activate said one of said wordlines and clock said read operation.

18. The method, according to claim 17, said operating of said digital integrated circuit in said second mode effectively converts said memory device into a performance screen ring oscillator (PSRO) having an oscillation frequency that is a function of memory access speed.

19. The method, according to claim 17, further comprising acquiring oscillation frequencies associated with read operations of multiple memory cells located at different addresses within said memory array and analyzing said oscillations frequencies to get a statistical representation of overall memory performance.

20. The method, according to claim 17, said internally generating of said second clock signal comprising gating at least two data output signals from at least two of said memory cells in order to generate said second clock signal.

* * * * *